Nov. 28, 1961 A. SEV 3,011,053

PULSE RECEIVERS

Filed Nov. 26, 1958 2 Sheets-Sheet 2

3,011,053

PULSE RECEIVERS

Alexandre Sev, Paris, France, assignor to Compagnie Generale de Telegraphie Sans Fil, a corporation of France Filed Nov. 26, 1958, Ser. No. 776,579

Claims priority, application France Dec. 19, 1957

6 Claims. (Cl. 250—20)

The present invention relates to pulse receivers and more particularly to an improved pulse receiver adapted for a satisfactory reception of pulsed signals in spite of any interference by jamming signals.

It is well known that a frequency modulated jamming transmitter can effectively interfere with the reception of pulses by a pulse receiver in a wide frequency band, the jamming action becoming especially effective when the sweep frequency of the transmitter is higher than 100 kc./s.

It is an object of the present invention to provide a receiver adapted to avoid the effects of such a jamming.

A pulse receiver according to one embodiment of the invention comprises two channels in parallel for receiving jammed signals, one of said channels having means for blocking said signal propagation therein and the other channel having means responsive to said signals for providing control signals for activating said blocking means for a predetermined time $z$ following the reception of the front edge of said signals.

Preferably the above two channels are coupled to the intermediate frequency amplifier of the pulse receiver and are a part of the intermediate frequency stage thereof.

The invention will be better understood from the following description and the appended drawing, wherein.

Figure 1:
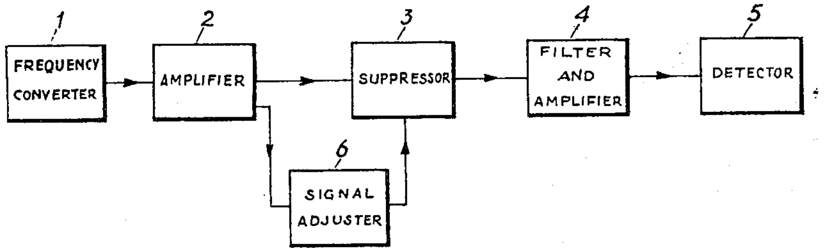
FIG. 1 is a block diagram of a receiver according to the invention.

According to the embodiment shown in FIG. 1, a receiver of the invention comprises a frequency converter stage 1 converting the ultra high frequency signals received into intermediate frequency signals. This stage feeds an intermediate frequency amplifier 2, the pass band B of which is much wider than $1/t$, where $t$ is the duration of the pulse received, $Bt$ being generally selected to be greater than 5. Amplifier 2 feeds in series an assembly 4, comprising a narrow-band filter centered on the intermediate frequency and an intermediate frequency amplifier, and a detector 5 followed by a conventional video amplifier. All these elements are conventional and are found in any pulse receiver. They are well known in the art and need not be described herein in greater detail.

The receiver portion wherein the present invention is more particularly embodied comprises a suppressor device 3, inserted between stages 2 and 4, and a signal adjuster stage 6, comprising a wide-band detector followed by a differentiator, a video amplifier, a rectifier and a resistance capacitance circuit and coupled in parallel between stages 2 and 3. Stage 6 is adapted to apply to suppressor 3 a pulse of predetermined duration as will be presently described.

Figure 2:
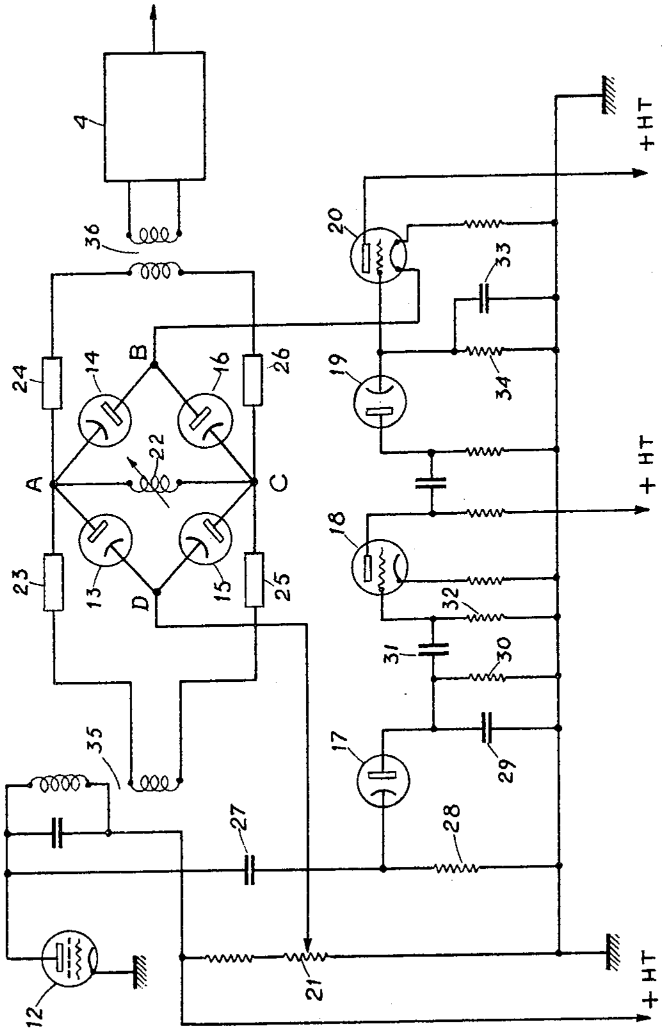
FIG. 2 is a block diagram of a preferred embodiment of the invention.

FIG. 2 is an illustrative embodiment of a first arrangement according to the invention. A tube 12, for example a pentode, forming the output stage of the wide band amplifier 2 drives, through the secondary coil of a transformer 35 whose primary is in the anode circuit of tube 12, a bridge comprising two arms having respectively in series impedances 23, 24 and 25, 26, a second bridge comprising diodes 13, 14, 15, 16 which are coupled as shown in the drawing, being connected between points A and C which are respectively located intermediate impedances 23, 24 and 25, 26. Points A and C are moreover connected through a variable inductance coil 22. The bridge of impedances 23 to 26 drives in turn, through a transformer 36, stage 4 of the receiver comprising as indicated above, a narrow-band filter centered on the intermediate frequency, followed by an intermediate frequency amplifier. The anode of tube 12 is connected through a capacitor 27 to a detector diode 17, constituting the first element of assembly 6 of FIG. 1, and to ground through a resistance 21. The anode of diode 17 is coupled to ground through a capacitor 29 and a resistor 30 in parallel, and to the grid of a triode 18 through a decoupling capacitor 31, the grid circuit of triode 18 comprising a resistance 32. The anode of triode 18 is connected to the anode of a diode 19 whose cathode is connected to the grid of a triode 20 which is coupled as a cathode follower. The cathode circuit of diode 19 comprises a resistance 34 and a capacitor 33 connected in parallel. The cathode of triode 20 is connected to apex B of the diode bridge, the opposite apex D of which is connected to a variable tap potentiometer 21 which is in the anode circuit of tube 12.

Figure 3:
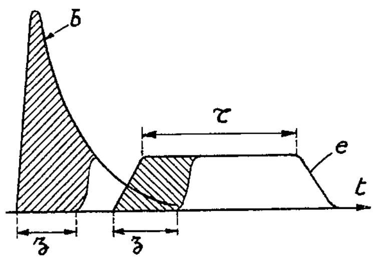
FIGS. 3 and 4 are explanatory curves.
Figure 4:
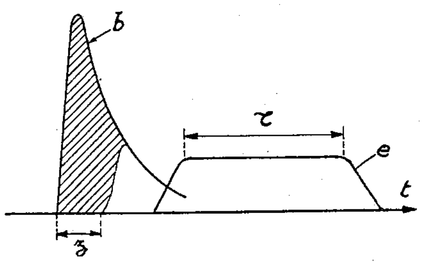

Prior to proceeding to a description of the operation of the system illustrated in FIG. 2, a few explanatory remarks will be made which may be helpful for the understanding of the operation. Reference will be made for this purpose to FIGS. 3 and 4. The scanning of the receiver frequency band by jamming signals causes damped trains of oscillations to occur in the receiver. In the case of a rapid frequency sweep, the duration of the transient oscillation trains is defined by the attenuation characteristics of the amplifier. The time required for reaching a 20 db attenuation is generally of the order of $1/B$, B being the pass-band of the amplifier.

As is known, if the pass-band of the intermediate frequency amplifier of the receiver is widened, the peak voltage of a received jamming pulse increases while the amplitude of the damped oscillations decreases all the more rapidly. Thus, the duration of the transient jamming pulse may be made much shorter in a wide-band amplifier than the duration of the echo pulse.

For the sake of simplicity, a single jamming pulse $b$ and a single echo pulse $e$ have been shown in FIGS. 3 and 4, it being however understood that the relative position of these two pulses is absolutely random. In the case of FIG. 3, the operating threshold of the suppressor according to the invention is lower than the amplitude of the incident each pulse $e$. It follows that the leading edge of the latter triggers the suppressor device into action for a time $z$, the suppressor being arranged for suppressing any signal of an amplitude higher than the operating threshold during a period $z$ from the beginning of this signal. This threshold is preferably adjusted to such a level that it leaves echo signals unaltered in the absence of jamming pulses, as shown in FIG. 4. The hatched portions in FIGS. 3 and 4 show the portions of the signals suppressed by the suppressor device according to the invention.

Of course, time $z$ must decrease as the jamming scanning repetition frequency increases. Otherwise, an increasing portion of every incident signal will be suppressed. For all practical purposes $z$ should not exceed one half of the frequency sweep period. It is essential to note that $z$ must be reduced as a function of time T between two successive pulses. The suppressor action thus maintains a maximum of flexibility and fits the modulation pattern of the jamming signals.

The operation of the device illustrated in FIG. 2 is as follows:

The intermediate frequency signal, derived from tube 12 is detected by diode 17. The time constant in the charging case is determined mainly by the internal resistance of tube 12 and is quite low. On the contrary, the time constant in the discharge case, as defined by resistance 30 and capacitor 29, is longer. This constant has an important part in the determination of the suppression period $z$ as a function of time T separating two successive pulses. Pulses detected by diode 17 are differentiated in the circuit consisting of capacitor 31 and resistance 32. As the sweep frequency increases, period T decreases and the front edge of the signal collected across the capacitor 29 decreases in height, the differentiated pulses are reduced and are gradually shortened. Thus, by suitably choosing the constants $R_1C_1$ of resistance 30 and capacitor 29, it is possible to vary the suppressor effect as a function of time T. The differentiated pulse is amplified in stage 18 and prolonged by the circuit of diode 19 comprising condensor 33 and resistance 34. Circuit 33—34 drives the grid of triode 20 which is arranged as a cathode follower and the cathode of which applies the positive pulse thus formed to point B of the diode bridge. If this positive pulse is of sufficient amplitude, the four diodes 13, 14, 15, 16 are rendered conductive. The channel through which the incident signal normally propagates is thus shunted across points A and C by means of a low impedance. The resulting attenuation may be further stressed by assigning appropriate values to impedances 23, 24, 25, 26. In the absence of a suppressor pulse, diodes 13, 14, 15, 16 are rendered non-conductive under the action of the positive voltage $U_s$ provided by potentiometer 21. The static capacities of the diodes being tuned by inductance 22, the shunting impedance between apices A and C of the bridge is then made very high and the signal from stage 2 normally reaches stage 4.

Thus, in the absence of any jamming, the incident signal passes normally from stage 2 to stage 4, via stage 3. The occurrence of a jamming signal gives rise to a suppressor pulse in stage 6 which will cause stage 3 to be blocked once the desired amplitude is reached.

According to an alternative embodiment of the invention impedances 23 and 25 may be replaced by two wide-band delay circuits with a view towards leaving sufficient time for the suppressor pulse to reach point B before the jamming pulse which has caused it to occur has reached points A and C.

Figure 5:
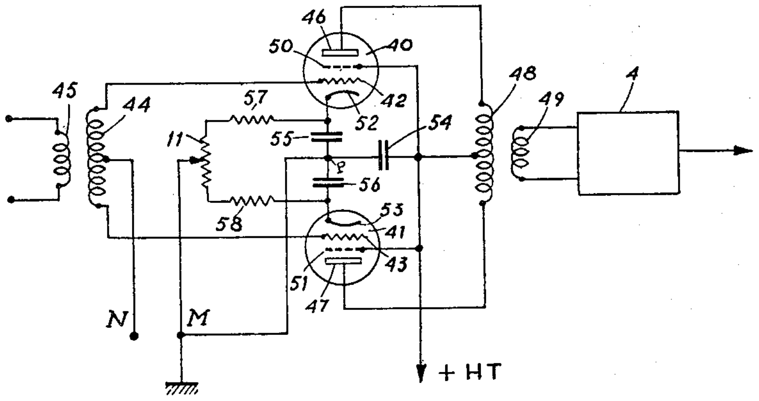
FIG. 5 is an alternative arrangement of the suppressor stage of the receiver.

A further alternative embodiment of suppressor 3 is shown in FIG. 5. According to this embodiment, stage 3 essentially comprises two symmetrically arranged tubes 40 and 41. Their respective control grids 42 and 43 are respectively connected to the ends of the secondary winding 44 of a transformer, the primary 45 of which is comprised in the anode circuit of the output tube of the wide-band amplifier 2 (FIG. 1). The mid-point of winding 44 is connected to a point N, the function of which will be presently explained. Anodes 46 and 27 of tubes 40 and 41 are respectively connected to the ends of the primary winding 48 of a transformer, the secondary winding 49 of which is connected to the following stage 4. The screen grids 50 and 51 of these tubes are connected to the high voltage source +HT, to the mid-point of the primary winding 48 and, through a capacitor 54, to a point P connected in turn through respective capacitors 55 and 56 to cathodes 52 and 53. Point P is grounded. A circuit for equalizing the anodic currents of the pentodes comprises resistors 57 and 58 connected in series and a potentiometer 11, the movable tap of which is grounded at M.

This device operates as follows:

When a negative pulse is applied at point N, the amplification of the stage is reduced, the control grids 42 and 43 of the push pull arranged tubes being driven by the output signal of amplifier 2 (FIG. 1). The signal is collected in the circuit of the anodes. The transients appearing in the pentodes are eliminated by symmetry.

It is to be understood that the invention is in no way limited to the embodiments described and illustrated, these embodiments being given only by way of example.

What I claim is:

1. In a pulse radar receiving system comprising a frequency converting stage for supplying intermediate frequency pulses, a noise pulse suppressor device comprising: an intermediate frequency amplifier whose frequency band is larger than $1/t$, where $t$ is the duration of the useful pulses, said wide band amplifier being coupled to said frequency converting stage and having an output; a main channel having an input connected to said amplifier output and an output; means for blocking the transmission between the input and the output of said main channel; an auxiliary channel also coupled to the output of said wide band amplifier and comprising in series a detector for supplying detected pulses, a differentiator for supplying differentiated pulses, a half-wave rectifier for selecting those portions of said differentiated pulses which correspond to the front edge of said detected pulses and a pulse stretching circuit for deriving from said portions duration adjusted pulses; and means for applying said duration adjusted pulses to said blocking means for blocking said transmission for a corresponding time following the incoming of the front edge of said intermediate frequency pulses.

2. In a pulse radar receiving system comprising a frequency converting stage for supplying intermediate frequency pulses, a noise suppressor device comprising: an intermediate frequency amplifier whose frequency band is larger than $3/t$ where $t$ is the duration of the useful pulses, said wide band amplifier being coupled to said frequency converting stage and having an output; a main channel having an input connected to said amplifier output and an output; said main channel having two branches in parallel; a diode bridge coupling said two branches; means for making said diode bridge normally non conductive; an auxiliary channel also coupled to the output of said wide band amplifier and comprising in series a detector for supplying detected pulses, a differentiator for supplying differentiated pulses, a half-wave rectifier for selecting those portions of said differentiated pulses which correspond to the front edge of said detected pulses, and a pulse stretching circuit for deriving from said portions duration adjusted pulses; and means for applying said duration adjusted pulses to said bridge for making said bridge conductive and blocking said transmission for a corresponding time following the front edge of said intermediate frequency pulses.

3. In a pulse radar receiving system comprising a frequency converting stage for supplying intermediate frequency pulses, a noise pulse suppressor device comprising: an intermediate frequency amplifier whose frequency band is larger than $3/t$, where $t$ is the duration of the useful pulses, said wide band amplifier being coupled to said frequency converting stage and having an output; a main channel having an input connected to said amplifier output and an output; means for blocking the transmission between the input and the output of said main channel; said main channel having two branches in parallel, said two branches including respective delay devices; an auxiliary channel also coupled to the output of said wide band amplifier and comprising in series a detector for supplying detected pulses, a differentiator for delivering differentiated pulses, a half-wave rectifier for selecting those portions of said differentiated pulses which correspond to the front edge of said detected pulses, and a pulse stretching circuit for deriving from said portions duration adjusted pulses; and means for applying said duration adjusted pulses to said blocking means for blocking said transmission for a corresponding time following the incoming of the front edge of said intermediate frequency pulses.

4. In a radar receiver comprising a frequency converting stage for supplying intermediate frequency pulses, a noise pulse suppressor device comprising: a wide band frequency amplifier coupled to said frequency converting stage, said amplifier having an output; a main channel and an auxiliary channel coupled in parallel to said output; said main channel having an output and comprising electronic tube means having control grid means; said auxiliary channel comprising a detector, a differentiator, a half wave rectifier, and a pulse duration adjusting circuit having an output; and means for coupling the output of said duration adjusting circuit to said control grid means for blocking said electronic tube means.

5. In a pulse radar receiver comprising a frequency converting stage for supplying intermediate frequency pulses: a jamming pulse suppressor device comprising a wide band intermediate frequency amplifier coupled to said frequency converting stage, said amplifier having an output; a main channel having an input connected to the output of said wide band amplifier and an output; means for blocking the transmission of signals between the input and the output of said main channel through control pulses, said blocking means being operative only for control pulses exceeding a given level; an auxiliary channel also connected to the output of said wide band amplifier and comprising in series a detector, a differentiator, a half-wave rectifier and a pulse stretching circuit having an output; and means for coupling the output of said pulse stretching circuit to said blocking means.

6. In a pulse radar receiver comprising a frequency converting stage for supplying intermediate frequency pulses and a narrow band intermediate frequency stage, a noise pulse suppressor device comprising: a wide band intermediate frequency amplifier coupled to said frequency converting stage and having an output; a main channel having an input connected to the output of said wide band amplifier and an output; means for blocking the transmission of signals between the input and the output of said main channel; an auxiliary channel also connected to the output of said wide band amplifier and comprising in series a detector, a differentiator, a half-wave rectifier and a pulse stretching circuit, said detector comprising a resistance-capacitance circuit whose discharging time constant is longer than its charging time constant; means for coupling the output of said pulse stretching circuit to said blocking means; and means for coupling said output of said main channel to said narrow band intermediate frequency stage.

References Cited in the file of this patent

UNITED STATES PATENTS

| | | |
|---|---|---|
| 1,931,866 | Heising | Oct. 24, 1933 |
| 2,118,626 | Smith | May 24, 1938 |
| 2,151,739 | Burrill | Mar. 28, 1939 |
| 2,199,401 | Haffcke | May 7, 1940 |
| 2,329,558 | Scherbatskoy | Sept. 14, 1943 |
| 2,468,058 | Grieg | Apr. 26, 1949 |
| 2,538,040 | Prichard | Jan. 16, 1951 |
| 2,678,388 | Loughlin | May 11, 1954 |
| 2,728,852 | Moran | Dec. 27, 1955 |
| 2,756,328 | Braak | July 24, 1956 |
| 2,844,713 | Zuckerman | July 22, 1958 |
| 2,929,921 | Clark | Mar. 22, 1960 |